US012052471B2

(12) United States Patent
Chow et al.

(10) Patent No.: US 12,052,471 B2
(45) Date of Patent: Jul. 30, 2024

(54) PERSONALIZED INFORMATIONAL USER EXPERIENCES USING VISUAL CONTENT

(71) Applicant: VMware LLC, Palo Alto, CA (US)

(72) Inventors: Adam Chow, Atlanta, GA (US);
Ravish Chawla, Chamblee, GA (US);
Rohit Pradeep Shetty, Bangalore (IN)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 17/750,337

(22) Filed: May 21, 2022

(65) Prior Publication Data
US 2023/0412887 A1 Dec. 21, 2023

(51) Int. Cl.
*H04N 21/442* (2011.01)
*H04N 21/466* (2011.01)

(52) U.S. Cl.
CPC ... *H04N 21/4668* (2013.01); *H04N 21/44224* (2020.08)

(58) Field of Classification Search
None
See application file for complete search history.

(56) References Cited

U.S. PATENT DOCUMENTS

| | | | | |
|---|---|---|---|---|
| 7,107,544 B1 * | 9/2006 | Luke | | H04L 51/42 715/752 |
| 2003/0135853 A1 * | 7/2003 | Goldman | | H04N 21/44224 348/E7.071 |
| 2003/0195937 A1 * | 10/2003 | Kircher, Jr. | | H04L 9/40 709/207 |
| 2005/0193055 A1 * | 9/2005 | Angel | | G06Q 30/02 709/204 |
| 2005/0203929 A1 * | 9/2005 | Hazarika | | G06F 16/24578 |
| 2009/0081630 A1 * | 3/2009 | Jeffers | | G09B 5/06 434/362 |
| 2010/0077041 A1 * | 3/2010 | Cowan | | G06Q 10/107 709/206 |
| 2013/0042007 A1 * | 2/2013 | Linton | | G06Q 10/10 709/226 |
| 2015/0058428 A1 * | 2/2015 | Caskey | | H04L 51/02 709/206 |
| 2017/0062009 A1 * | 3/2017 | Clifton | | G11B 27/031 |
| 2017/0154114 A1 * | 6/2017 | Lehodey | | G06F 16/353 |
| 2018/0048595 A1 * | 2/2018 | Dotan-Cohen | | G06Q 10/1093 |
| 2018/0098030 A1 * | 4/2018 | Morabia | | H04L 65/403 |

(Continued)

FOREIGN PATENT DOCUMENTS

WO WO-2014184420 A1 * 11/2014 ............ G06Q 10/10
WO WO-2021259322 A1 * 12/2021 ............ G06K 9/3233

*Primary Examiner* — William J Kim
(74) *Attorney, Agent, or Firm* — Kim & Stewart LLP

(57) ABSTRACT

Disclosed are various examples for to generating personalized user experiences in the form of short-form videos that summarize informational topics that are selected to present to a user according at least one of a user context or a user interest. As the informational topics are identified for a given user, the informational topics can be applied as inputs to a recommendation model that is trained to recommend one or more of the topics to summarize and present to a user in visual form based on at least one of the user context or the user interest. Once a topic is recommended by the recommendation model, a video or other type of visual content can be automatically generated and presented to a user to allow the user to consume the information in the summarized form.

20 Claims, 7 Drawing Sheets

(56) References Cited

U.S. PATENT DOCUMENTS

| | | | |
|---|---|---|---|
| 2021/0182700 A1* | 6/2021 | Bax | G16H 20/60 |
| 2022/0005070 A1* | 1/2022 | Raviv | G06Q 30/0206 |
| 2022/0058978 A1* | 2/2022 | Lewis | G09B 15/08 |
| 2022/0415366 A1* | 12/2022 | Li | G06V 20/49 |

\* cited by examiner

PERSONALIZED INFORMATIONAL USER EXPERIENCES USING VISUAL CONTENT

BACKGROUND

With the emergence of bring-your-own-device (BYOD) technology in the workplace, enterprises permit employees or other personnel to use their own devices for business purposes. This can include accessing enterprise data, such as email and corporate documents. In addition, enterprises can provide company-owned devices to employees that may be used for personal use and therefore can be used to connect over secured or unsecured networks. However, a company can require the employee to enroll the device with a management service capable of protecting enterprise data from theft, loss, and unauthorized access. Administrators can utilize the management service to oversee operation of the devices enrolled with or otherwise managed by the service.

In an enterprise, an enterprise ecosystem can provide a structure for information sharing and communications for enterprise employees. For example, information sharing and communications can be supported by the enterprise ecosystem through the form of email or text messaging. In addition, the enterprise ecosystem can be structured to provide employees access to enterprise files that may contain enterprise manuals, policies, and procedures. However, while the enterprise ecosystem can facilitate information sharing and communications to employees, accessing and reviewing the information shared and communications within the enterprise can be time-consuming, inefficient or overwhelming for the employee, thereby resulting in the potential for the employee to miss important updates or information. In particular, as attention spans are getting shorter, the modes of information consumption are changing.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
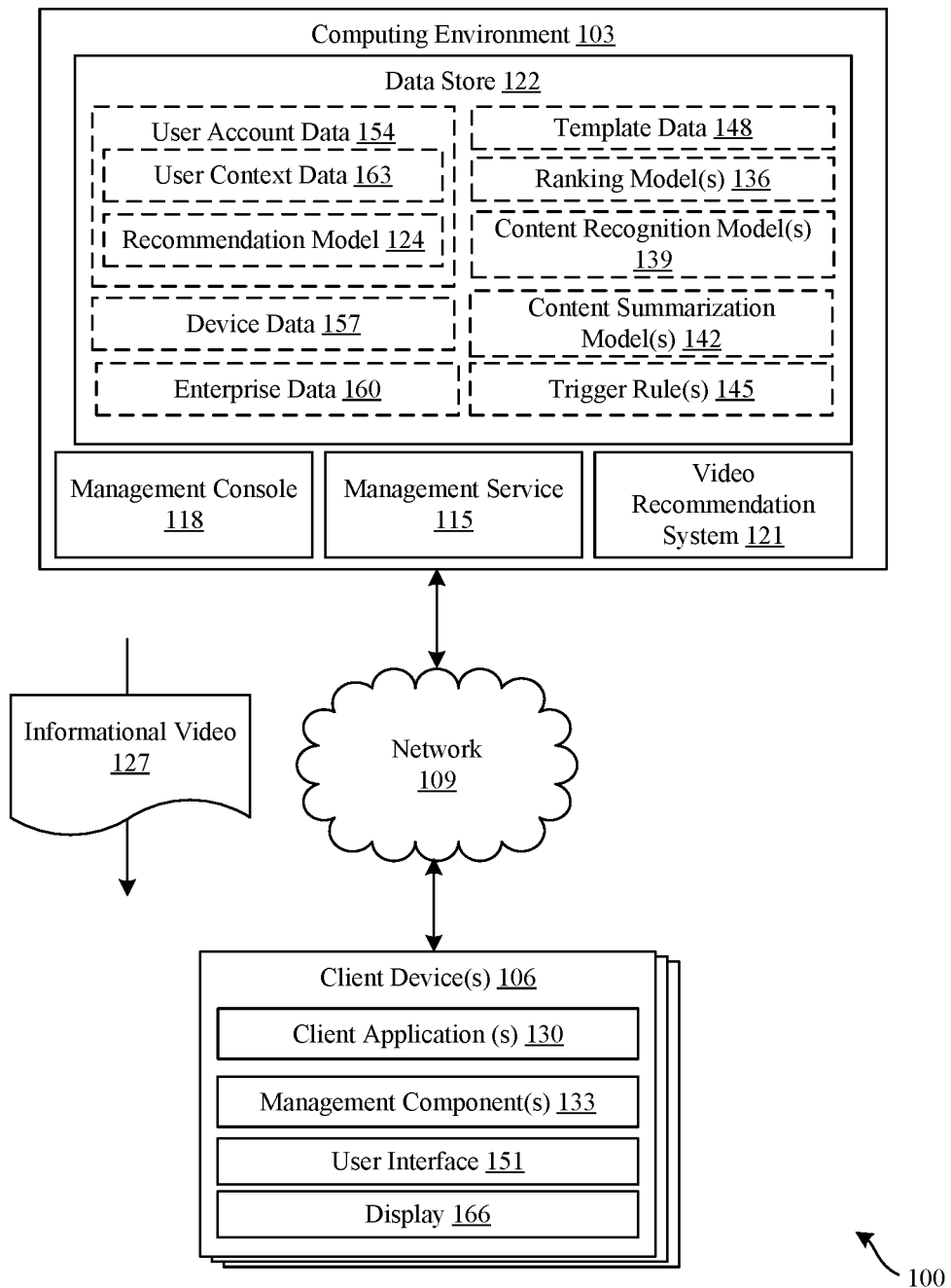
FIG. 1 is a drawing of a networked environment including a management service that communicates firmware profiles to managed devices.

The present disclosure relates to generating personalized user experiences in the form of short-form videos or other type of visual content that summarize informational topics that are selected to present to a user according at least one of a user context or a user interest. In various examples, the informational topics can correspond to email-based topics (e.g., upcoming events, meeting previews, company announcements, etc.), trigger-based topics (e.g., user device changes, user status changes, etc.), administrator-defined topics (e.g., scheduled device or software updates, etc.), or other types of informational topics. As the informational topics are identified for a given user, the informational topics can be applied as inputs to a recommendation model that is trained to recommend one or more of the topics to summarize and present to a user in visual form based on at least one of the user context or the user interest. Once a topic is recommended by the recommendation model, a video or other type of visual content can be automatically generated and presented to a user to allow the user to consume the information in the summarized form.

In an enterprise setting, information sharing and communications can occur using various channels including, for example, email messaging, text messaging, and applications that provide access to enterprise files that may contain enterprise manuals, policies, procedures, and other enterprise related material. However, accessing and reviewing the information shared and communications within the enterprise can be time-consuming, inefficient, and overwhelming for the employee, thereby resulting in the potential for the employee to miss important updates or information. Therefore, it can be beneficial to keep the user captive and more engaged by sharing information to the user in the form of a short-form video that includes a summary of information that is personalized for the user according to a user context or user interest.

According to various implementations, the short-form video content or other type of visual content that is generated can be referred to as a "story" that comprises a summary of information associated with a given topic. In various examples, a short-form video is a time-restricted video that can extend in length up a predefined amount of time. In some examples, the predefined amount of time can be administrator-defined and based at least in part on an expected attention span of the consuming user. Typically, a short-form video can be a video that is up to two minutes and thirty seconds. However, a predefined maximum length of the short-form videos of the present disclosure can be greater or less than two minutes and thirty seconds.

In various implementations, the generated stories that are provided to users can correspond to a variety of informational topics that are recommended according to the user context and user interest. A user context can be based on a variety of factors including, for example, a user interaction history, a user device status, a user device location, a user job profile, an organization group, an organization title, one or more upcoming travel engagements, a travel history, a calendar profile, a time (e.g., date, year, week, day), a seasonality, user interests, and/or other type of factors. In an enterprise setting, the informational topics can correspond to topics including, for example, software or hardware updates for a managed device, device security, email updates, travel-specific topics, training class alerts or recommendations, employee wellness, technical implications, or other types of topics.

In various implementations, the informational topics for a given user are identified through at least one of: received messages (e.g., emails, text messages, etc.), triggers (e.g., user status changes, device status changes, etc.), or administrator-defined topics. Once a topic is recommended by the recommendation model, a story is automatically generated and presented to a user to allow the user to consume the information associated with the recommended topic in the summarized form. When multiple stories are recommended and generated, the stories can be ranked according to the user context or user interest to allow the stories to be presented to the user in an order defined by the ranking. As users interact with the generated stories, the recommendation model can be updated based at least in part on the interactions by the user with the provided stories.

With reference to FIG. 1, shown is an example of a networked environment 100. The networked environment 100 can include a computing environment 103 and one or more client devices 106 (also called client device 106) in communication with one other over a network 109. The network 109 can include wide area networks (WANs) and local area networks (LANs). These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 109 can also include a combination of two or more networks 109. Examples of networks 109 can include the Internet, intranets, extranets, virtual private networks (VPNs), and similar networks.

The computing environment 103 can include, for example, a server computer, or any other system providing computing capability. Alternatively, the computing environment 103 can include a plurality of computing devices that are arranged, for example, in one or more server banks, computer banks, or other arrangements. The computing environment 103 can include a grid computing resource or any other distributed computing arrangement. The computing devices can be located in a single installation or can be distributed among many different geographical locations.

The computing environment 103 can also include or be operated as one or more virtualized computer instances. For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the client device 106 remotely over the network 109, the computing environment 103 can be described as a remote computing environment 103.

Various applications can be executed in the computing environment 103. For example, a management service 115, a management console 118, a video recommendation system 121, as well as other applications, may be executed in the computing environment. Also, various data is stored in a data store 122 that is accessible to the computing environment 103. The data store 122 may be representative of a plurality of data stores 122, which can include relational databases, object-oriented databases, hierarchical databases, hash tables or similar key-value data stores, as well as other data storage applications or data structures. The data stored in the data store 122 is associated with the operation of the various applications or functional entities described below.

The management service 115 can be executed to oversee the operation of client devices 106 enrolled with the management service 115. In some examples, an enterprise, such as a company, organization, or other entity, can operate the management service 115 to oversee or manage the operation of the client devices 106 of its employees, contractors, customers, or other users having accounts with the enterprise. An enterprise can include any customer of the management service 115.

The management console 118 can provide an administrative interface for configuring the operation of the management service 115 and the configuration of client devices 106 that are administered by the management service 115. Accordingly, the management console 118 can correspond to a web page or web application provided by a web server hosted in the computing environment 103. For example, the management console 118 can provide an interface for an administrative user to create configuration profiles to be applied to individual client devices 106, identify application updates that may be required on individual client devices 106, define recommended applications or updates for individual client devices 106, identify security requirements for individual client devices 106, recommend training that is available for users associated with individual client devices 106, as well as various other actions related to the operation of various implementations.

The video recommendation system 121 can be executed to identify informational topics associated with a given user, apply the informational topics as inputs to a recommendation model 124 to identifying a subset of informational topics to present to the user in short video form, and generate the informational videos 127 (e.g., stories) that comprise summaries of the content associated with the informational topics. In various implementations, the informational topics can correspond to email-based topics (e.g., upcoming events, meeting previews, company announcements, etc.), trigger-based topics (e.g., user device changes, user status changes, etc.), administrator-defined topics (e.g., scheduled device or software updates, etc.), or other types of informational topics. The video recommendation system 121 can identify the informational topics in response to data analytics (e.g., device status change, user status change, etc.), user or administrator-defined content (wellness information, security updates, new application notifications, etc.), interactions or integrations with one or more services associated with the management service 115, client application 130, management components 133, or other services or applications within the computing environment 103 or client device 106. For example, the service interactions or integrations can provide informational topics associated with email content, employee training, new application availability, compliance notifications or updates, and/or other type of informational topics.

In various examples, the video recommendation system 121 can identify various informational topics based at least in part on various models and algorithms, including, for example, ranking model(s) 136, content recognition model(s) 139, content summarization model(s) 142), and trigger rules 145. In various implementations, the one or more informational topics identified by the video recommendation system 121 can correspond to topics including, for example, software or hardware updates for a managed client device 106, device security, email updates, travel-specific topics, training class alerts or recommendations, employee wellness, technical implications, or other types of topics.

In various implementations, the video recommendation system 121 can apply the identified topics as inputs to a trained recommendation model 124 associated with the given user. The recommendation model 124 is trained to recommend one or more of the informational topics based at least in part on a user context. The user context can be based on a variety of factors including, for example, a user interaction history, a user device status, a user device location, a user job profile, an organization group, an organization title, one or more upcoming travel engagements, a travel history, a calendar profile, a time (e.g., date, year, week, day), a seasonality, user interests, or other type of factors.

Upon identifying the recommended informational topics to present as stories (e.g., informational video(s) 127) based at least in part on an output of the recommendation model 124, the video recommendation system 121 can use a ranking model 136 to rank the informational topics. For example, the ranking model 136 can rank the informational topics based at least in part to a story value, user interaction on previous stories of a similar type, due dates or event dates associated with the informational topic, and/or other features. In various examples, the informational videos 127 can be arranged for consumption by the user according to the ranking provided by the ranking model 136.

In various examples, the video recommendation system 121 can determine a category associated with the informational topic. For example, categories can correspond to email follow-ups, location-based, events, update notifications, memories, recognitions, and/or other type of categories. In various examples, the video recommendation system 121 can determine the category based at least in part on whether the informational topics corresponds to an email-based topics, trigger-based topics, administrator-defined topics, or other types of informational topics. For example, an informational topic that is identified based at least in part on a device status change (e.g., device location) may be placed in a location-based category.

Upon identifying the informational topic category, the video recommendation system 121 can select a predefined template from a plurality of predefined templates included in the template data 148 according to the identified category. Accordingly, the video recommendation system 121 can generate an informational video 127 (e.g., a story) based at least in part on the selected template, the informational topic, and content associated with the informational topic. According to various implementations, the informational video 127 comprises short-form video content or other type of visual content that comprises a summary of information associated with a given topic. In various examples, a short-form video is a time-restricted video that can extend in length up a predefined amount of time. In various examples, the predefined amount of time can be administrator-defined and based at least in part on an expected attention span of the consuming user. Typically, a short-form video can be a video that is up to two minutes and thirty seconds. However, a predefined maximum length of the short-form videos of the present disclosure can be greater or less than two minutes and thirty seconds.

Upon generating the informational videos 127 for each of the recommended informational topics, the video recommendation system 121 transmits the informational videos 127 to the client device 106 for rendering. In one or more examples, the video recommendation system 121 transmits to the client device 106 user interface code that is executable by the client application 130 or management component 133 to generate and render a user interface 151 comprising the informational videos 127 or user interface components for accessing the informational videos 127 on the client device 106. In other examples, the video recommendation system 121 transmits a generated user interface 151 comprising the informational videos 127 or user interface components for accessing the informational videos 127 to the client device 106 for rendering. For example, the video recommendation system 121 sends data associated with the generated user interface 151 in response to an application programming interface (API) call from the client application 130 or management component 133.

Although the management service 115 and the video recommendation system 121 are illustrated as being separate applications, it should be noted that some or all the functionality of the video recommendation system 121 can be included in the functionality of the management service 115. Likewise, some or all of the functionality of the management service 115 can be included in the functionality of the video recommendation system 121.

The data stored in the data store 122 can include, for example, user account data 154, device data 157, enterprise data 160, template data 148, one or more ranking models 136, one or more content recognition models 139, one or more content summarization models 142, trigger rules 145, as well as potentially other data.

The user account data 154 can include information pertaining to end users of the client devices 106 enrolled with the management service 115. For instance, the user account data 154 can include data used to authenticate an end user, such as a username, password, email address, biometric data, device identifier, registry identifier, or other data. Additionally, the user account data 154 can include other information associated with an end user, such as name, organization unit, or other information. In various implementations, the user account data 154 can include user context data 163, a recommendation model 124, or other data.

The user context data 163 can include, for example, a user interaction history (e.g., viewing history of prior informational videos 127), a user device status, a user device location, a user job profile, a user organization group, a user organization title, one or more upcoming travel engagements, a travel history, a calendar profile, a time (e.g., date, year, week, day), a seasonality, one or more user interests, or other data. The recommendation model 124 is specific to each user and can include, for example, a reinforcement learning algorithm, a logistic regression classifier, a random forest classifier, a decision tree classifier, a XGBoost classifier, a multi-layer perceptron classifier, a recurrent neural network, a feed-forward neural network, a label-specific attention network, and/or any other type of trained model as can be appreciated. In various implementations, the recommendation model 124 can be trained to recommend one or more of the topics to summarize and present to a user in visual form based on at least one of the user context or the user interest. For example, one or more informational topics can be fed as inputs into the recommendation model 124 to make a final decision as to which informational topics should be generated into informational videos 127 and provided to the user for consumption.

In various implementations, the recommendation model 124 comprises a Q-learning based model that learns the user's interests and behaviors based at least in part on feedback data which informs the model of which informational videos 127 the user has previously interacted with or ignored over time. In one or more implementations, when the recommendation model 124 is first deployed for a given user, the informational topics can be randomly selected. The user interest can be captured based at least in part on which informational videos 127 the user has viewed, interacted with, or ignored. The recommendation model 124 can learn over time, and new informational topics will be recommended based at least in part on the user interests included in the feedback data and the user context.

The device data 157 can include information about the client device 106. The device data 157 can include, for example, information specifying applications that are installed on the client device 106, configurations or settings that are applied to the client device 106, user accounts associated with the device 106, the physical location of the client device 106, the enterprise associated with the client device 106, the network to which the client device 106 is connected, the device group(s) to which the client device 106 belongs, and/or other information associated with the client device 106. Enterprise data 160 can include email, corporate documents, social media, messages, enterprise applications, confidential documents, and other enterprise content or communications.

The template data 148 includes predefined templates that can be used by the video recommendation system 121 to generate an informational video 127 comprising content associated with a recommended informational topic that is arranged according to the selected template. In various examples, the predefined informational templates can be organized according to a type of informational topic category. An informational topic category can correspond to, for example, email follow-ups, locations, events, update notifications, memories, recognitions, and/or other type of categories. In various examples, the predefined templates can comprise email follow-up templates, location templates, event templates, enterprise update templates, memory or recognition templates, or other types of templates.

In various examples, an email follow-up template can be used to generate an informational video 127 that may include features, such as, an email sender's photo, summarized content of an email, quick-action buttons to reply, mark as read, delete, flag, or snooze the email, or other information. A location template can be used in response to a change in device location and can be used to generate an informational video 127 that may show highlights of a new geographical location associated with the new location, including weather, things to do, important contacts within the company, security policies associated with the new location, or other information.

An event template can be selected in response to an identified event (e.g., company picnic, meeting notice, scheduled training, etc.). The event template can be used to generate an informational video 127 that comprises content that shows an invite to an upcoming event, including any event information, a static photo, RSVP buttons, and/or other information. An enterprise update template can be selected if the informational topic corresponds to device or application update recommendations or requirements. For example, an informational video 127 generated using the enterprise update template can comprise content that shows application or pending security updates, pending application updates, compliance updates, applications that are available and are either recommended or required, best practices, or other types of information.

A memory or recognition template can be selected to generate an informational video 127 associated with an informational topic related to a memory or a recognition. For example, an informational video 127 generated using the memory or recognition template can show any recognitions that the user receives, such as on-the-spot rewards, promotions, completed certifications, or other type of recognitions. In some examples, the generated informational video 127 can illustrate photos or comments associated with memories such as this-day last year memories.

A ranking model 136 can include, for example, a reinforcement learning algorithm, a logistic regression classifier, a random forest classifier, a decision tree classifier, a XGBoost classifier, a multi-layer perceptron classifier, a recurrent neural network, a feed-forward neural network, a label-specific attention network, and/or any other type of trained model as can be appreciated. In various examples, a ranking model 136 can be applied for different situations. For example, a ranking model 136 can be used to prioritize emails based at least in part on a sender and email content. In this example, emails sent by certain senders can be prioritized and shown to the user based at least in part on an importance of the sender (e.g., company lead, chief executive officer, vice president, etc.).

In another example, a ranking model 136 can be used to rank informational topics that are recommended by a recommendation model 124. Informational topics that are recommended to become informational videos 127 can be ranked based at least in part on a priority. In particular, a ranking model 136 can use different attributes to rank the recommended topics based on priority and importance to the user. The attributes can include, for example, a story value that may be predefined based on an informational topic category, user interactions on previous stories of similar type, expiration date, event date, or other type of information. In various examples, the ranking model 136 can use an unsupervised distance-based model that can update over time.

The content recognition models 139 can include, for example, a reinforcement learning algorithm, a logistic regression classifier, a random forest classifier, a decision tree classifier, a XGBoost classifier, a multi-layer perceptron classifier, a recurrent neural network, a feed-forward neural network, a label-specific attention network, and/or any other type of trained model as can be appreciated. In various examples, the content recognition models 139 uses regular expression and clustering models to identify informational topics associated with emails or other type of messaging. In various examples, regular expressions defined by an administrator or other user can be used to identify emails or other types of messages that meet certain criteria. For example, the emails can be identified based at least in part on specific subject titles or content text.

In various examples, all identified user emails can be fed into the content recognition model 139 to be classified into an email category based at least in part on the identified content included in the email. In various examples, the content recognition model 139 comprises an unsupervised clustering model to classify the emails into the different email categories based at least in part on the recognized content. In various implementations, the model 139 will be pre-trained on a larger email dataset to generate a set of categories that the emails can be classified into. The categories can include, for example, updates, promotions, social, priority, events, or other types of categories. When an email is classified into an existing category, it can be used to generate an informational video 127 using a template that is associated with the identified category.

The content summarization models 142 are configured to summarize and shorten content included in an email or other type of messaging for inclusion in an informational video 127. For example, the content of emails selected to be included in an informational video 127 will need to be summarized and shortened. In various examples, the content summarization model 142 takes larger content as an input and outputs a smaller version that captures the main meaning of the message. For example, a sequence-to-sequence based neural network can be trained to summarize and shorten the email content provided as an input. However, the content summarization models 142 can include, for example, a reinforcement learning algorithm, a logistic regression classifier, a random forest classifier, a decision tree classifier, a XGBoost classifier, a multi-layer perceptron classifier, a recurrent neural network, a feed-forward neural network, a label-specific attention network, and/or any other type of trained model as can be appreciated.

The trigger rules 145 include rules, models, and/or configuration data for the various algorithms or approaches employed by the video recommendation system 121. In various examples, informational topics can be identified based at least in part on external alerts. The trigger rules 145 can define what types of external alerts can be considered for informational videos 127 to present to the user. For example, a change in a user's location (captured by a client application 130 or management component 133) can trigger an informational topic and result in an informational video 127 that includes information related to the location. For example, the location change could further trigger compliance concerns that the user should be notified about. In addition, a change in a user's profile (e.g., promotion, organization change, etc.) can further trigger an informational video 127. For example, the change in a user's profile can result in an informational video 127 that is generated using a recognition template to highlight a promotion or other type of recognition that is associated with the user status change.

The client device 106 is representative of one or more client devices that may be connected to the network 109. Examples of client devices 106 include processor-based systems, such as desktop computers, a laptop computers, a personal digital assistant, a cellular telephone, a smartphone, a tablet computer system, smart speakers or similar headless devices, or any other device with like capability. The client device 106 can also be equipped with networking capability or networking interfaces, including a localized networking or communication capability, such as a near-field communication (NFC) capability, radio-frequency identification (RFID) read or write capability, or other localized communication capability.

The client device 106 can include an operating system which can be configured to execute various client applications 130, such as the management components 133, as well as other applications. In particular, the operating system can include a system software that facilitates operation of the client device 106, and execution of additional client applications. The main operating system can include an APPLE® iOS operating system, a MICROSOFT® Windows operating system, an APPLE® macOS operating system, a Linux operating system, a GOOGLE® Android operating system, or other operating systems.

Some client applications 130 can access enterprise data 160 and other network content served up by the computing environment 103 or other servers, thereby rendering a user interface 151 on a display 166, such as a liquid crystal display (LCD), touch-screen display, or other type of display device. To this end, some client applications 130, including the management component 133, can include a browser or a dedicated application, and a user interface 151 can include a network page, an application screen, or other interface. In some examples, a network page can include a web page having source code defined in hypertext markup language (HTML), cascading style sheets (CSS), Javascript, j Query, or other applicable client-side web-based scripting language. Further, other client applications 130 can include device management applications, enterprise applications, social networking applications, word processors, spreadsheet applications, media viewing applications, instant messaging applications, or other applications.

In various examples, the client application 130, including the management component 133, can interact with the management service 115 or video recommendation system 121 to receive the generated informational videos 127. In various examples, the client application 130 can generate a user interface 151 comprising the informational videos 127 arranged in accordance with a ranking of importance to the user. In some examples, the user interface 151 comprises user interface components that upon selection cause one or more of the informational videos 127 to be played or otherwise rendered on the client device 106.

The management component 133 can be executed by the client device 106 to maintain data communication with the management service 115 in order to perform various actions on the client device 106 in response to instructions received from the management service 115. In some instances, the management component 133 includes a separate application executing on the client device 106. In other instances, the management component 133 includes a device management framework provided by or included in the operating system installed on the client device 106. The management component 133 can be configured to contact the management service 115 at periodic intervals and request that the management service 115 send any commands or instructions stored in a command queue to the management component 133. The management component 133 can then cause the client device 106 to perform the commands (e.g., provide status request, wipe client device 106, etc.) provided by the management service 115 or cause the client device 106 to modify the configuration settings installed on the client device 106 in accordance with any updated or received configuration profiles received from the management service 115.

Figure 2:
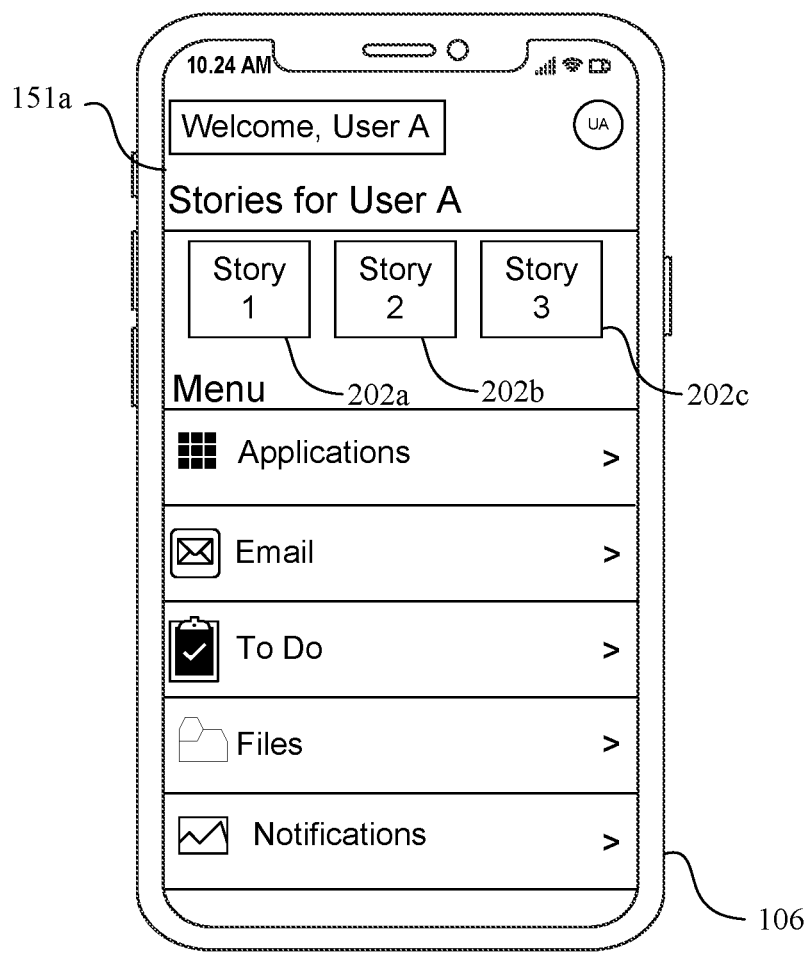
FIGS. 2, 3A, 3B, 4, and 5 are drawings of example user interfaces of a client application of the networked environment.

Moving on to FIGS. 2-5, shown are examples user interfaces 151 (e.g., 151a, 151b, 151c, 151d, and 151e) that can be rendered on a client device 106 via a client application 130, including the management component 133. To begin, FIG. 2 illustrates an example user interface 151 that can be rendered by the client application 130 (or management components 133) and corresponds to an example user interface 151 that can be rendered to provide access to various features provided by the management service 115. For example, the user interface 151 corresponds to a menu interface that provides options to access various services provided by the management service 115. In FIG. 2, the user interface 151a includes user interface components 202 (e.g., 202a, 202b, 202c). The user interface components 202 correspond to selectable components, that upon selection, cause a corresponding informational video 127 to be rendered on the client device 106 and consumed by the associated user. In various examples, the user interface components 202 are arranged according to a ranking that priorities the informational videos 127 based at least in part on a user context, user interest, or overall importance of the content included in the informational video 127.

In various implementations, the informational videos 127 associated with the user interface components 202 can correspond to informational topics including, for example, software or hardware updates for a managed client device 106, device security, email updates, travel-specific topics, training class alerts or recommendations, employee wellness, technical implications, or other types of topics. In various examples, informational videos 127 corresponding to software or hardware updates can comprise summaries or notifications of (1) new applications that are available and are recommended by an administrator, (2) reminders for applications that are already on a user device and are in need of an update, (3) compliance updates for when a given user's device is in violation or needs to be updated, or other types of information. In other examples, informational videos 127 associated with device security topics can include summaries of current device status and operations that may need to be performed (e.g., enable firewall based on the device location), recommendations of best practices, and/or other types of device security topics.

In various examples, informational videos 127 corresponding to email updates can include summarized content from essential emails (e.g., company wide announcements, organization updates, events and social hours, product announcements, etc.). In some examples, emails that are considered important based at least in part on a sender of the email can be summarized in an informational video 127. In some examples, the informational videos 127 associated with an email-based topic can include company policy updates, best practices recommended, new employee announcements, recognitions and awards, or other information.

In various examples, informational videos 127 corresponding to a given location can be generated in response to determining that the user is in a new location or is about to be in a new location. For example, these type of informational videos 127 can include information that is specific to the given location such as company contacts, activities to do, location specific training events, updates, travel policy reminders, recommended or required security updates, or other information.

Figure 4:
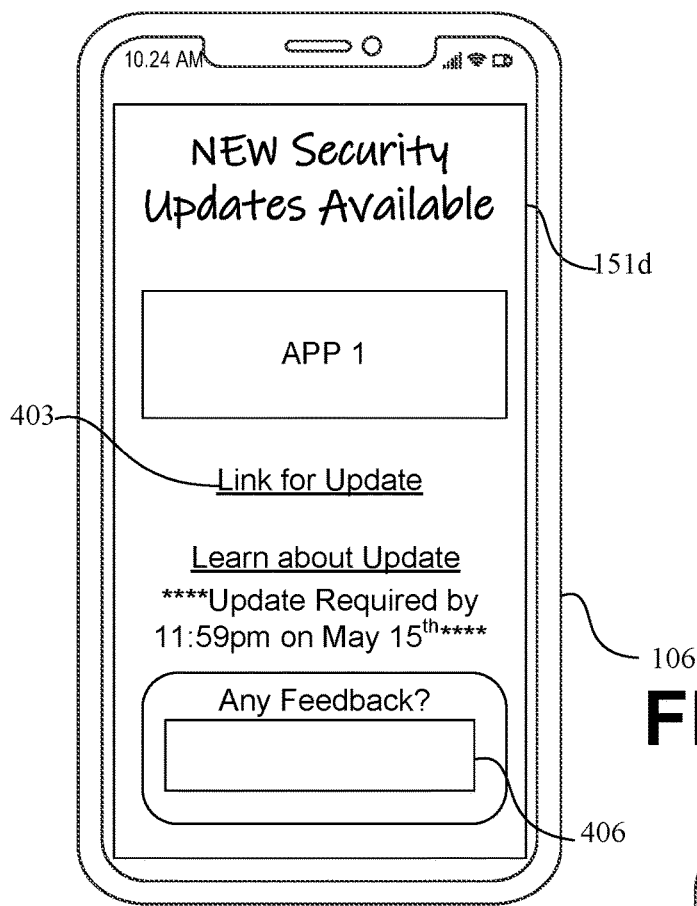
Figure 5:
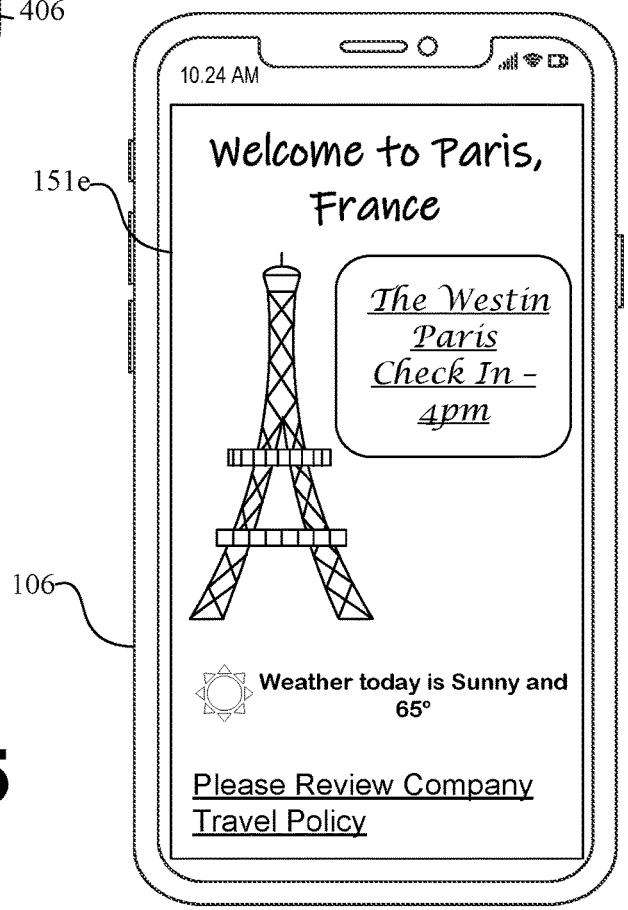

In various examples, informational videos 127 corresponding to trainings can include updates alerting the user as to when new training is made available to the user, such as development training, security training, management training, human resource training, and other types of training. In some examples, the informational videos 127 can further comprise summarized information or links associated with security must-knows, ethics hotline, company values, privacy best-policies, or other educational updates. In various implementations, the informational videos corresponding to wellness can include a variety of information including, for example, ergonomic topics (e.g., best practices for sitting in chair), break recommendations (e.g., lunch recommendations), crowd-sourced tips, memories (e.g., this day last year), or other wellness information. FIGS. 3B, 4, and 5 illustrate examples of user interfaces 151 that include informational videos 127 associated with some of the informational topics that can be recommended by the recommendation model 124 to present to the user in a summarized form.

Figure 3A:
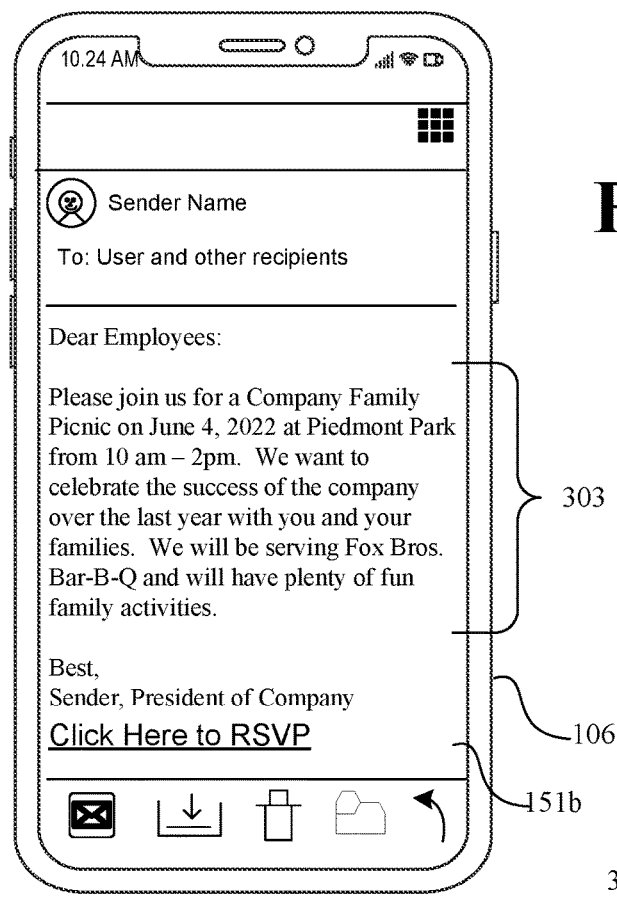
Figure 3B:

Turning now to FIGS. 3A and 3B, shown are example user interfaces 151b, 151c that can be rendered on a client device 105 via a client application 130. In particular, FIG. 3A illustrates an example of an email that may be sent to the user. Accordingly, the email of FIG. 3A illustrates an email including an invitation to a company event. The email content includes email body text 303, sender identification, and a link to RSVP to the event. According to various examples of the present disclosure, the email of FIG. 3A can be analyzed by the video recommendation system 121 using the content recognition models 139, the ranking model 136, and the content summarization model 142 to identify the particular email as an informational topic that should be considered for an informational video 127.

FIG. 3B illustrates an example of a user interface 151c that includes an informational video 127 that is generated according to the email of FIG. 3A. In particular, the content recognition models 139 can classify the email as belonging to an event category and the informational video 127 of FIG. 3B can be generated using to an event category template. As illustrated in FIG. 3B, the informational video 127 comprises a quote 306 summarizing the email body text 303 and the event details associated with the event including, the event location 309, the event date, and the event time. In addition, the informational video 127 can include a link to view the email, a link to RSVP to the event, a sender photo 312 of the sender of the invitation, and/or other type of information.

FIG. 4 illustrates an example of a user interface 151d that can be rendered on a client device 106. In particular, the user interface 151d includes an informational video 127 corresponding to one or more security updates that are required. In various examples, the security updates can correspond to informational topics that are email-based, trigger-based, or administrator-defined. In the example of FIG. 4, the informational video 127 includes an identification of an application requiring the update, a download link 403 for downloading or initiating the update, an information link that provides access to additional information about the update, an indication of when the update must be installed, and a comment component 406. For example, the comment component 406 can allow the user to provide comments or other information that may be useful to the administrator or the models used by the video recommendation system 121 to identify informational topics or recommend informational topics based at least in part on user context.

FIG. 5 illustrates an example of a user interface 151e that can be rendered on a client device 106 via a client application 130. In particular, the user interface 151e includes an informational video 127 that is generated in response to a change in device location. For example, the informational video 127 indicates that the user is in Paris and welcomes the user to Paris. In addition, the informational video 127 of FIG. 5 includes information that may be useful to the user with respect to the user's travel to Paris. For example, the informational video 127 of FIG. 5 includes an identification of the hotel that the user is staying at which can be obtained from an email or calendar notification. In addition, the informational video 127 include the weather as well as a link to view the enterprise travel policy. Although not included in FIG. 5, the informational video 127 can further include comment components 406 (FIG. 4) that allow the user to ask questions or provide comments. Further, the informational video 127 can include security updates or device implementations that are required based at least in part on the user's device location.

Figure 6:
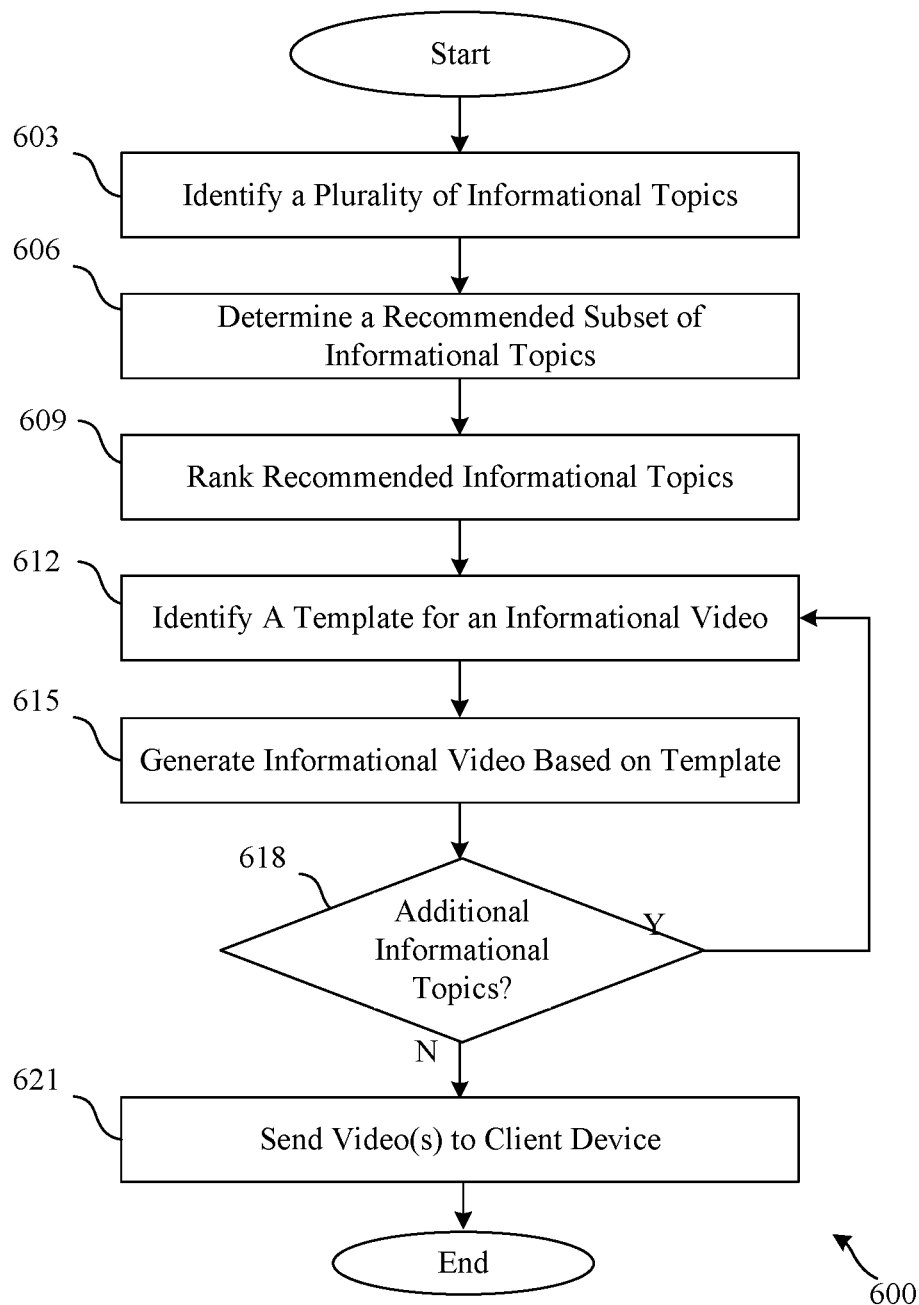
FIGS. 6-9 are flowcharts depicting the example operations of a component of the computing environment of the network environment of FIG. 1.

Moving on to FIG. 6, shown is a flowchart 600 that provides one example of the operation of a portion of the video recommendation system 121. The flowchart of FIG. 6 can be viewed as depicting an example of elements of a method implemented by the video recommendation system 121 executing in the computing environment 103 according to one or more examples. The separation or segmentation of functionality as discussed herein is presented for illustrative purposes only.

Beginning at step 603, the video recommendation system 121 identifies a plurality of informational topics. The video recommendation system 121 can identify the informational topics in response to data analytics (e.g., device status change, user status change, etc.), user or administrator-defined content (wellness information, security updates, new application notifications, etc.), interactions or integrations with one or more services associated with the management service 115, client application 130, management components 133, or other services or applications within the computing environment 103 or client device 106. For example, the service interactions or integrations can provide informational topics associated with email content, employee training, new application availability, compliance notifications or updates, and/or other type of informational topics. In an enterprise setting, the informational topics can correspond to topics including, for example, software or hardware updates for a managed device, device security, email updates, travel-specific topics, training class alerts or recommendations, employee wellness, technical implications, or other types of topics.

At step 606, the video recommendation system 121 determines a recommended subset of the informational topics to present to the user in a short-form video (e.g., informational video 127) based at least in part on an output of a recommendation model 124 that is associated with the user. In various implementations, the video recommendation system 121 can apply the identified informational topics as inputs to the trained recommendation model 124. The recommendation model 124 is trained to recommend one or more of the informational topics based at least in part on a user context. The user context can be based on a variety of factors including, for example, a user interaction history, a user device status, a user device location, a user job profile, an organization group, an organization title, one or more upcoming travel engagements, a travel history, a calendar profile, a time (e.g., date, year, week, day), a seasonality, user interests, or other type of factors.

In various implementations, the recommendation model 124 comprises a Q-learning based model that learns the user's interests and behaviors based at least in part on feedback data which informs the model of which informational videos 127 the user has previously interacted with or ignored over time. In one or more implementations, when the recommendation model 124 is first deployed for a given user, the informational topics can be randomly selected. The user interest can be captured based at least in part on which informational videos 127 the user has viewed, interacted with, or ignored. The recommendation model 124 can learn over time, and new informational topics will be recommended based at least in part on the user interests included in the feedback data and the user context.

At step 609, the video recommendation system 121 ranks the recommended informational topics. For example, the video recommendation system 121 uses a ranking model 136 to rank the informational topics that are recommended by a recommendation model 124. In various examples, the ranking model 136 can use different attributes to rank the recommended topics based on priority and importance to the user. The attributes can include, for example, a story value that may be predefined based on an informational topic category, user interactions on previous stories of similar type, expiration date, event date, or other type of information. In various examples, the ranking model 136 can use an unsupervised distance-based model that can update over time.

At step 612, the video recommendation system 121 can identify a template for an informational video 127 based at least in part on a particular informational topic. In various implementations, the informational topic can be the highest ranked informational topic from the ranking of the informational topics. In particular, the video recommendation system 121 can identify or otherwise select a template from a plurality of templates based at least in part on a category associated with the informational topic. For example, categories can correspond to email follow-ups, location-based, events, update notifications, memories, recognitions, and/or other type of categories. In various examples, the video recommendation system 121 can determine the category based at least in part on whether the informational topics corresponds to an email-based topics, trigger-based topics, administrator-defined topics, or other types of informational topics. For example, an informational topic that is identified based at least in part on a device status change (e.g., device location) may be placed in a location-based category. Upon identifying the informational topic category, the video recommendation system 121 can select a predefined template from a plurality of predefined templates included in the template data 148 according to the identified category.

At step 615, the video recommendation system 121 can generate an informational video 127 based at least in part on the selected template, the informational topic, and summarized content associated with the informational topic. According to various implementations, the informational video 127 comprises short-form video content or other type of visual content that comprises a summary of information associated with a given topic. In various examples, a short-form video is a time-restricted video that can extend in length up a predefined amount of time. The predefined amount of time can be administrator-defined and based at least in part on an expected attention span of the consuming user.

At step 618, the video recommendation system 121 determines if there are other informational topics that are recommended. If there are other recommended informational topics, the video recommendation system 121 returns to step 612. Otherwise, the video recommendation system 121 proceeds to step 621.

At step 621, the video recommendation system 121 transmits the generated informational videos 127 to the client device 106 for rendering. In one or more examples, the video recommendation system 121 transmits to the client device 106, user interface code that is executable by the client application 130 or management component 133 to generate and render a user interface 151 comprising the informational videos 127 or user interface components 202 for accessing the informational videos 127 on the client device 106. In other examples, the video recommendation system 121 transmits a generated user interface 151 comprising the informational videos 127 or user interface components 202 for accessing the informational videos 127 to the client device 106 for rendering. For example, the video recommendation system 121 sends data associated with the generated user interface 151 in response to an application programming interface (API) call from the client application 130 or management component 133. Thereafter, the process ends.

Figure 7:
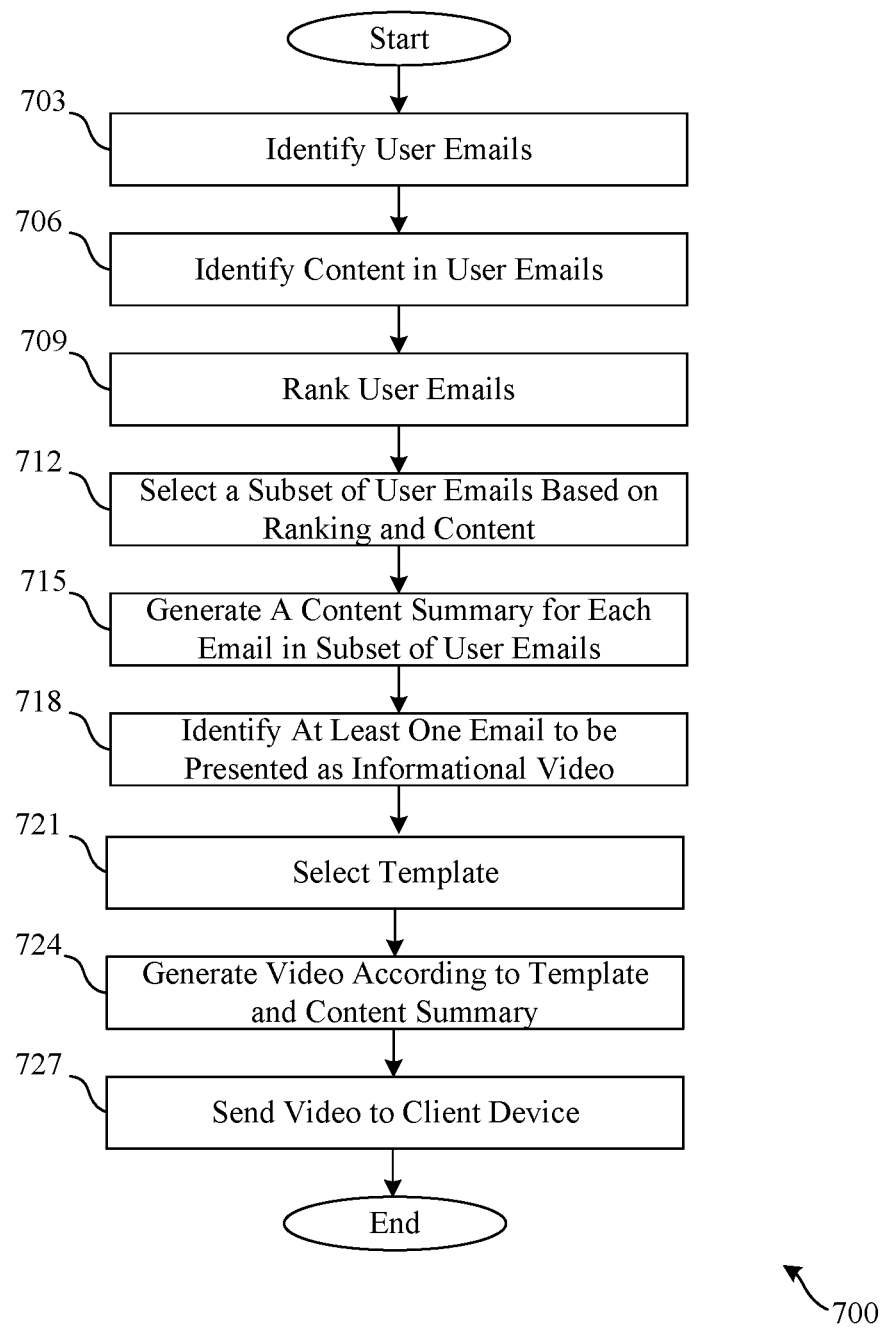

Moving on to FIG. 7, shown is a flowchart 700 that provides one example of the operation of a portion of the video recommendation system 121. The flowchart of FIG. 7 can be viewed as depicting an example of elements of a method implemented by the video recommendation system 121 executing in the computing environment 103 according to one or more examples. The separation or segmentation of functionality as discussed herein is presented for illustrative purposes only.

Beginning at step 703, the video recommendation system 121 identifies emails associated with the user. In some examples, the video recommendation system 121 is integrated with or interacts with an email service to identify emails that are being received by the user's email service.

At step 706, the video recommendation system 121 identifies the email content included in the identified emails. For example, the video recommendation system 121 uses content recognition models 139 to identify the email content. In various examples, the content recognition models 139 uses regular expression and clustering models to identify informational topics associated with emails or other type of messaging. In various examples, regular expressions defined by an administrator or other user can be used to identify emails or other types of messages that meet certain criteria. For example, the emails can be identified based at least in part on specific subject titles or content text.

In various examples, all identified user emails can be fed into the content recognition model 139 to be classified into an email category based at least in part on the identified content included in the email. In various examples, the content recognition model 139 comprises an unsupervised clustering model to classify the emails into the different email categories based at least in part on the recognized content.

At step 709, the video recommendation system 121 ranks the identified emails. For example, the video recommendation system 121 can apply a ranking model 136 to rank the emails based at least in part on a plurality of attributes. The attributes can include, for example, a sender profile, date of email, email content, or other information. For example, emails sent by certain senders can be prioritized and shown to the user based at least in part on an importance of the sender (e.g., company lead, chief executive officer, vice president, etc.). The output of the ranking model 136 can include a ranking of the identified emails.

At step 712, the video recommendation system 121 selects a subset of the user emails based at least in part on the ranking and the content. For example, the video recommendation system 121 can select the emails according to factors including a ranking placement, an importance of the sender, an email category, or other factor. In some examples, the video recommendation system 121 can apply weights to one or more of the factors and generate a score based on a sum of the weights. The subset of the emails can be selected according to whether the score satisfies a predetermined threshold value.

At step 715, the video recommendation system 121 generates a content summary for each of the selected emails. For example, the video recommendation system 121 generates a content summary using one or more content summarization models 142 that are configured to summarize and shorten content included in an email or other type of messaging for inclusion in an informational video 127. For example, the content of emails selected to be included in an informational video 127 will need to be summarized and shortened. In various examples, the content summarization model 142 takes larger content as an input and outputs a smaller version that captures the main meaning of the message. For example, a sequence-to-sequence based neural network can be trained to summarize and shorten the email content provided as an input.

At step 718, the video recommendation system 121 identifies at least one email to be presented as an informational video 127. In various implementations, the video recommendation system 121 can apply the identified emails as inputs to the trained recommendation model 124. The recommendation model 124 is trained to recommend one or more of the emails based at least in part on a user context. The user context can be based on a variety of factors including, for example, a user interaction history, a user device status, a user device location, a user job profile, an organization group, an organization title, one or more upcoming travel engagements, a travel history, a calendar profile, a time (e.g., date, year, week, day), a seasonality, user interests, or other type of factors.

At step 721, the video recommendation system 121 selects a template for a recommended email (e.g., informational topic). In particular, the video recommendation system 121 can identify or otherwise select a template from a plurality of templates based at least in part on a category associated with email. The category can include, for example, updates, promotions, social, priority, events, or other types of categories. In various examples, the category corresponds to the category identified by the content recognition model 139. Upon identifying the category, the video recommendation system 121 can select a predefined template from a plurality of predefined templates included in the template data 148 according to the identified category.

At step 724, the video recommendation system 121 generates an informational video 127 according to the selected template and the content summary. According to various implementations, the informational video 127 comprises short-form video content or other type of visual content that comprises a summary of information associated with a given topic. In various examples, a short-form video is a time-restricted video that can extend in length up a predefined amount of time. The predefined amount of time can be administrator-defined and based at least in part on an expected attention span of the consuming user.

At step 727, the video recommendation system 121 sends the generated informational video(s) 127 to the client device 106. In one or more examples, the video recommendation system 121 transmits to the client device 106, user interface code that is executable by the client application 130 or management component 133 to generate and render a user interface 151 comprising the informational videos 127 or user interface components 202 for accessing the informational videos 127 on the client device 106. In other examples, the video recommendation system 121 transmits a generated user interface 151 comprising the informational videos 127 or user interface components 202 for accessing the informational videos 127 to the client device 106 for rendering. For example, the video recommendation system 121 sends data associated with the generated user interface 151 in response to an application programming interface (API) call from the client application 130 or management component 133. Thereafter, the process ends.

Figure 8:
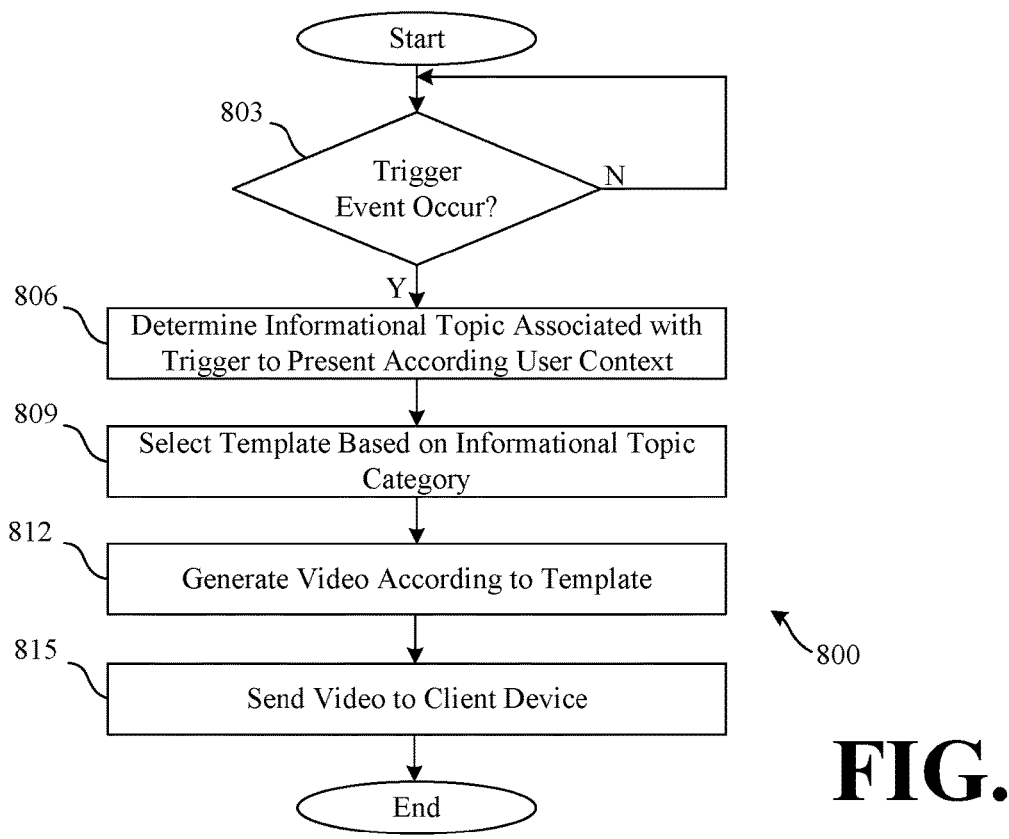

Moving on to FIG. 8, shown is a flowchart 800 that provides one example of the operation of a portion of the video recommendation system 121. The flowchart of FIG. 8 can be viewed as depicting an example of elements of a method implemented by the video recommendation system 121 executing in the computing environment 103 according to one or more examples. The separation or segmentation of functionality as discussed herein is presented for illustrative purposes only.

Beginning at step 803, the video recommendation system 121 determines if a trigger event has occurred. For example, a trigger event can correspond to an external trigger occurs in response to a user status change, a user device status change, or other type of change. In various examples, the video recommendation system 121 can identify a trigger event based at least in part on the trigger rules 145. For example, the trigger rules 145 can define what types of external alerts can be considered for informational videos 127 to present to the user. For example, a change in a user's location (captured by a client application 130 or management component 133) can trigger an informational topic and result in an informational video 127 that includes information related to the location. For example, the location change could further trigger compliance concerns that the user should be notified about. In addition, a change in a user's profile (e.g., promotion, organization change, etc.) can further trigger an informational video 127. For example, the change in a user's profile can result in an informational video 127 that is generated using a recognition template to highlight a promotion or other type of recognition that is associated with the user status change. In response to detecting a trigger event, the video recommendation system 121 proceeds to step 806. Otherwise, the video recommendation system 121 continues to wait for a trigger event at step 803.

At step 806, the video recommendation system 121 identifies an informational topic associated with the trigger event to present as an informational video 127 based at least in part on the user context. In various implementations, the video recommendation system 121 can apply identified informational topics associated with the trigger event and other events to the trained recommendation model 124. The recommendation model 124 is trained to recommend one or more of the informational topics based at least in part on a user context. The user context can be based on a variety of factors including, for example, a user interaction history, a user device status, a user device location, a user job profile, an organization group, an organization title, one or more upcoming travel engagements, a travel history, a calendar profile, a time (e.g., date, year, week, day), a seasonality, user interests, or other type of factors. In this example, the informational topic associated with the trigger event is recommended by the recommendation model 124 to present to the user in an informational video 127.

At step 809, the video recommendation system 121 selects a template for a recommended informational topic. In particular, the video recommendation system 121 can identify or otherwise select a template from a plurality of templates based at least in part on a category associated with the trigger event. The category can include, for example, updates, location, social, recognition, or other types of categories. Upon identifying the category, the video recommendation system 121 can select a predefined template from a plurality of predefined templates included in the template data 148 according to the identified category.

At step 812, the video recommendation system 121 generates an informational video 127 according to the selected template and content associated with the trigger event. According to various implementations, the informational video 127 comprises short-form video content or other type of visual content that comprises a summary of information associated with a given topic. In various examples, a short-form video is a time-restricted video that can extend in length up a predefined amount of time. The predefined amount of time can be administrator-defined and based at least in part on an expected attention span of the consuming user.

At step 815, the video recommendation system 121 sends the generated informational video(s) 127 to the client device 106. In one or more examples, the video recommendation system 121 transmits to the client device 106, user interface code that is executable by the client application 130 or management component 133 to generate and render a user interface 151 comprising the informational videos 127 or user interface components 202 for accessing the informational videos 127 on the client device 106. In other examples, the video recommendation system 121 transmits a generated user interface 151 comprising the informational videos 127 or user interface components 202 for accessing the informational videos 127 to the client device 106 for rendering. For example, the video recommendation system 121 sends data associated with the generated user interface 151 in response to an application programming interface (API) call from the client application 130 or management component 133. Thereafter, the process ends.

Figure 9:
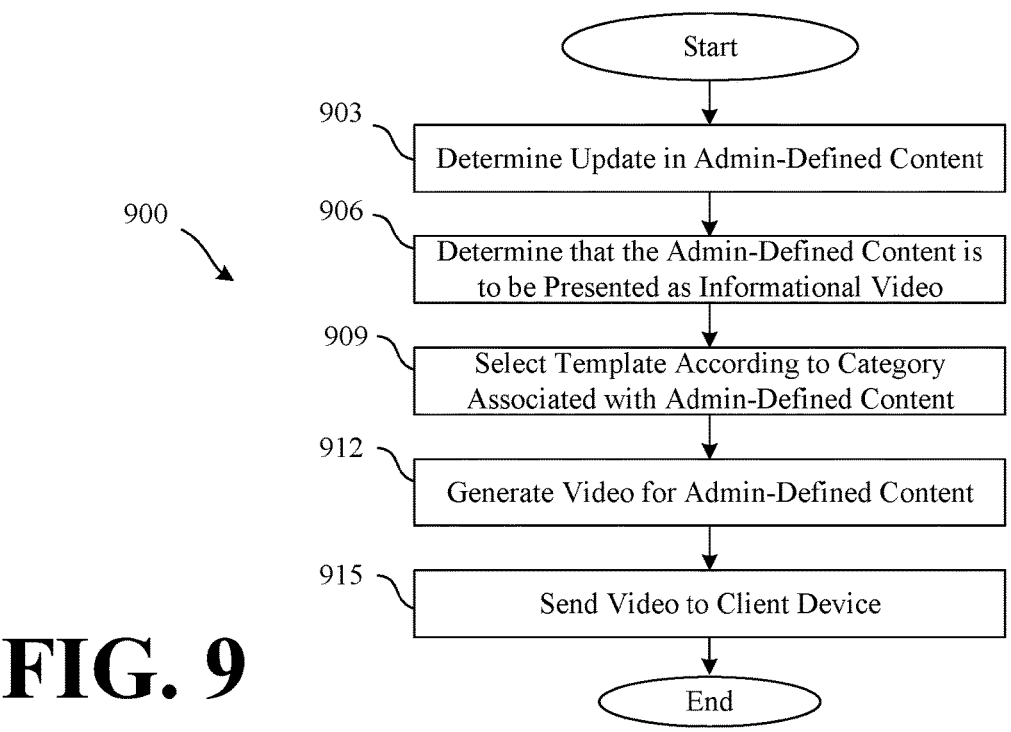

Moving on to FIG. 9, shown is a flowchart 900 that provides one example of the operation of a portion of the video recommendation system 121. The flowchart of FIG. 9 can be viewed as depicting an example of elements of a method implemented by the video recommendation system 121 executing in the computing environment 103 according to one or more examples. The separation or segmentation of functionality as discussed herein is presented for illustrative purposes only.

Beginning at step 903, the video recommendation system 121 identifies an update in administrator-defined content. For example, an administrator can recommend or require device updates, application updates, training events, or other types of content with respect to the user or the user's device. The video recommendation system 121 can identify the administrator-defined content and associated the administrator-defined content as an informational topic that can be applied as an input to the recommendation model 124.

At step 906, the video recommendation system 121 identifies an informational topic associated with the administrator-defined content to present as an informational video 127 based at least in part on the user context. In various implementations, the video recommendation system 121 can apply identified informational topics associated with the administrator-defined content and other events to the trained recommendation model 124. The recommendation model 124 is trained to recommend one or more of the informational topics based at least in part on a user context. The user context can be based on a variety of factors including, for example, a user interaction history, a user device status, a user device location, a user job profile, an organization group, an organization title, one or more upcoming travel engagements, a travel history, a calendar profile, a time (e.g., date, year, week, day), a seasonality, user interests, or other type of factors. In this example, the informational topic associated with the administrator-defined content that is recommended by the recommendation model 124 to present to the user in an informational video 127.

At step 909, the video recommendation system 121 selects a template for a recommended informational topic. In particular, the video recommendation system 121 can identify or otherwise select a template from a plurality of templates based at least in part on a category associated with the administrator-defined content. The category can include, for example, updates, location, social, recognition, recommendations, or other types of categories. Upon identifying the category, the video recommendation system 121 can select a predefined template from a plurality of predefined templates included in the template data 148 according to the identified category.

At step 912, the video recommendation system 121 generates an informational video 127 according to the selected template and the administrator-defined content. According to various implementations, the informational video 127 comprises short-form video content or other type of visual content that comprises a summary of information associated with a given topic. In various examples, a short-form video is a time-restricted video that can extend in length up a predefined amount of time. The predefined amount of time can be administrator-defined and based at least in part on an expected attention span of the consuming user.

At step 915, the video recommendation system 121 sends the generated informational video(s) 127 to the client device 106. In one or more examples, the video recommendation system 121 transmits to the client device 106, user interface code that is executable by the client application 130 or management component 133 to generate and render a user interface 151 comprising the informational videos 127 or user interface components 202 for accessing the informational videos 127 on the client device 106. In other examples, the video recommendation system 121 transmits a generated user interface 151 comprising the informational videos 127 or user interface components 202 for accessing the informational videos 127 to the client device 106 for rendering. For example, the video recommendation system 121 sends data associated with the generated user interface 151 in response to an application programming interface (API) call from the client application 130 or management component 133. Thereafter, the process ends.

The client devices 106 or devices comprising the computing environment 103 can include at least one processor circuit, for example, having a processor and at least one memory device, both of which are coupled to a local interface, respectively. The device can include, for example, at least one computer, a mobile device, smartphone, computing device, or like device. The local interface can include, for example, a data bus with an accompanying address/control bus or other bus structure.

Stored in the memory device are both data and several components that are executable by the processor. In particular, stored in the one or more memory devices and executable by the device processor can be the client application 130, the management component 133, and potentially other applications. Also stored in the memory can be a data store 122 and other data.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 106 can include a display 166 upon which a user interface 155 generated by the management console 118, the client application 130, the management component 133, or another application can be rendered. In some examples, the user interface can be generated using user interface data provided by the computing environment 103. The client device 106 can also include one or more input/output devices that can include, for example, a capacitive touchscreen or other type of touch input device, fingerprint reader, or keyboard.

Although the management service 115, management console 118, the video recommendation system 121, the client application 130, the management component 133, and other various systems described herein can be embodied in software or code executed by general-purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts of FIGS. 6-9 show examples of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram and flowchart of FIGS. 6-9 show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system, comprising:
a computing device comprising a processor and a memory; and
machine-readable instructions stored in the memory which, when executed by the processor, cause the computing device to at least:
determine a recommendation for content to present to a user in an informational video based at least in part on a user context, the recommendation corresponding to a topic associated with at least one of:
a user email, a trigger event, or an administrator-defined update;
select a template from a plurality of templates based at least in part on an informational topic category associated with the topic, the informational topic category being one of a plurality of informational topic categories, the plurality of informational topic categories comprising an email follow-up category, a trigger event category, and an administrator-defined content category;
generate the informational video based at least in part on the template, the category, and the content; and
send the informational video to a client device.

2. The system of claim 1, wherein the topic is one of a plurality of topics, and the recommendation is identified from an output of a trained recommendation model that is trained according to the user context associated with a particular user, the plurality of topics being inputs to the trained recommendation model.

3. The system of claim 1, wherein the user context comprises at least one of:
a user interaction history, a device status, a device location, a user job profile, an organization group, an organization title, one or more upcoming travel engagements, a travel history, a calendar profile, a day of a week, or a time of day.

4. The system of claim 1, wherein the informational video comprises a summary of the content associated with the topic.

5. The system of claim 1, wherein the trigger event is based at least in part on a user status change or a client device status change.

6. The system of claim 1, wherein the topic is associated with the user email, and wherein the machine-readable instructions, when executed by the processor, further cause the computing device to at least:
identify a plurality of user emails associated with a user account;
rank the plurality of user emails based at least in part on a respective sender profile and respective email content of individual user emails of the plurality of user emails;
select the user email from the plurality of user emails based at least in part on the ranking of user emails;
generate a content summary of the user email; and
provide the topic associated with the user email as an input to a trained recommendation model.

7. The system of claim 1, wherein the recommendation is one of a plurality of recommendations to present to the user and the informational video is one of a plurality of informational videos generated based at least in part on the plurality of recommendations, and the machine-readable instructions, when executed by the processor, further cause the computing device to at least determine a sequence to present the plurality of informational videos to the user based at least in part on a ranking of the plurality of recommendations.

8. A non-transitory computer-readable medium embodying executable instructions which, when executed by a computing device, cause the computing device to at least:
determine a recommendation for content to present to a user in an informational video based at least in part on a user context, the recommendation corresponding to a topic associated with at least one of:
a user email, a trigger event, or an administrator-defined update;
select a template from a plurality of templates based at least in part on an informational topic category associated with the topic, the informational topic category being one of a plurality of informational topic categories, the plurality of categories comprising an email follow-up category, a trigger event category, and an administrator—defined content category;
generate the informational video based at least in part on the template, the category, and the content; and
send the informational video to a client device.

9. The non-transitory computer-readable medium of claim 8, wherein the topic is one of a plurality of topics, and the recommendation is identified from an output of a trained recommendation model that is trained according to the user context associated with a particular user, the plurality of topics being inputs to the trained recommendation model.

10. The non-transitory computer-readable medium of claim 8, wherein the user context comprises at least one of:
a user interaction history, a device status, a device location, a user job profile, an organization group, an organization title, one or more upcoming travel engagements, a travel history, a calendar profile, a day of a week, or a time of day.

11. The non-transitory computer-readable medium of claim 8, wherein the informational video comprises a summary of the content associated with the topic.

12. The non-transitory computer-readable medium of claim 8, wherein the trigger event is based at least in part on a user status change or a client device status change.

13. The non-transitory computer-readable medium of claim 8, wherein the topic is associated with the user email, and further comprising executable instructions which, when executed by the computing device, further cause the computing device to at least:
identify a plurality of user emails associated with a user account;

rank the plurality of user emails based at least in part on a respective sender profile and respective email content of individual user emails of the plurality of user emails;

select the user email from the plurality of user emails based at least in part on the ranking of user emails;

generate a content summary of the user email; and provide the topic associated with the user email as an input to a trained recommendation model.

14. The non-transitory computer-readable medium of claim 8, wherein the recommendation is one of a plurality of recommendations to present to the user and the informational video is one of a plurality of informational videos generated based at least in part on the plurality of recommendations, and further comprising executable instructions which, when executed by the computing device, further cause the computing device to at least determine a sequence to present the plurality of informational videos to the user based at least in part on a ranking of the plurality of recommendations.

15. A computer-implemented method, comprising:

determining, by at least one computing device, a recommendation for content to present to a user in an informational video based at least in part on a user context, the recommendation corresponding to a topic associated with at least one of:

a user email, a trigger event, or an administrator—defined update;

selecting, by the at least one computing device, a template from a plurality of templates based at least in part on an informational topic category associated with the topic, the informational topic category being one of a plurality of informational topic categories, the plurality of informational topic categories comprising an email follow-up category, a trigger event category, and an administrator—defined content category;

generating, by the at least one computing device, the informational video based at least in part on the template, the category, and the content; and sending by the at least one computing device, the informational video to a client device.

16. The computer-implemented method of claim 15, wherein the topic is one of a plurality of topics, and the recommendation is identified from an output of a trained recommendation model that is trained according to the user context associated with a particular user, the plurality of topics being inputs to the trained recommendation model.

17. The computer-implemented method of claim 15, wherein the user context comprises at least one of:

a user interaction history, a device status, a device location, a user job profile, an organization group, an organization title, one or more upcoming travel engagements, a travel history, a calendar profile, a day of a week, or a time of day.

18. The computer-implemented method of claim 15, wherein the informational video comprises a summary of the content associated with the topic.

19. The computer-implemented method of claim 15, wherein the trigger event is based at least in part on a user status change or a client device status change.

20. The computer-implemented method of claim 15, wherein the topic is associated with the user email, and further comprising:

identifying a plurality of user emails associated with a user account;

ranking the plurality of user emails based at least in part on a respective sender profile and respective email content of individual user emails of the plurality of user emails;

selecting the user email from the plurality of user emails based at least in part on the ranking of user emails;

generating a content summary of the user email; and providing the topic associated with the user email as an input to a trained recommendation model.

\* \* \* \* \*